United States Patent [19]
Sedley

[11] 4,077,242
[45] Mar. 7, 1978

[54] METAL MAGNETIC KEY

[76] Inventor: Bruce S. Sedley, R.R. 1, Box 96, Koloa, Hi. 96756

[21] Appl. No.: 750,663

[22] Filed: Dec. 15, 1976

[51] Int. Cl.² .............................................. E05B 19/26
[52] U.S. Cl. ..................................................... 70/413
[58] Field of Search .................. 70/413, 276; 335/302, 335/303, 304, 285

[56] References Cited

U.S. PATENT DOCUMENTS

| | | | |
|---|---|---|---|
| 2,698,917 | 1/1955 | Van Urk | 335/302 |
| 3,407,371 | 10/1968 | Gosma | 335/302 |
| 3,423,708 | 1/1969 | Christian | 335/302 |
| 3,546,643 | 12/1970 | Virostek | 335/303 |
| 3,834,197 | 9/1974 | Sedley | 70/276 |

OTHER PUBLICATIONS

Credit Card Design, J. Svigals, Aug. 1966, vol. 9, No. 3, p. 314.

Primary Examiner—Robert L. Wolfe
Attorney, Agent, or Firm—Gordon Wood

[57] ABSTRACT

A substantially indestructible magnetic card key having an exterior formed completely of metallic material such as stainless steel. In the preferred form, one side of the key is of magnetizable material and the other of non-magnetizable material to enhance the operation of the key and simplify its encoding.

4 Claims, 6 Drawing Figures

U.S. Patent  March 7, 1978  4,077,242
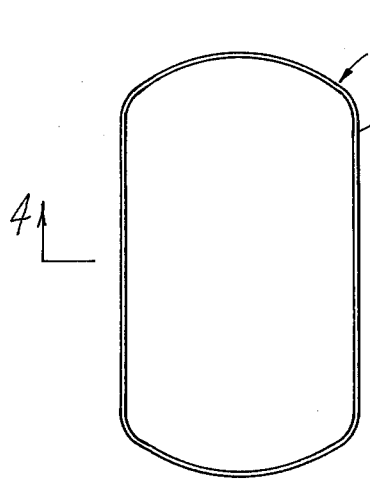
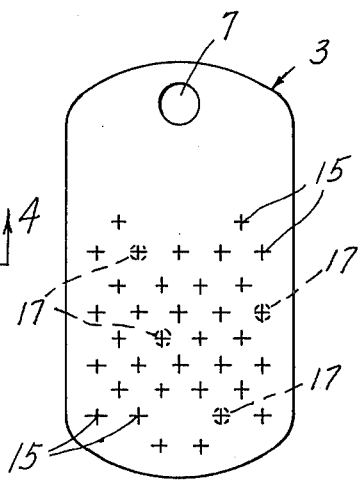
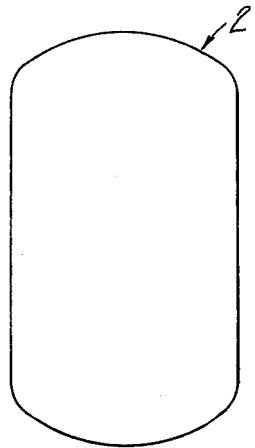
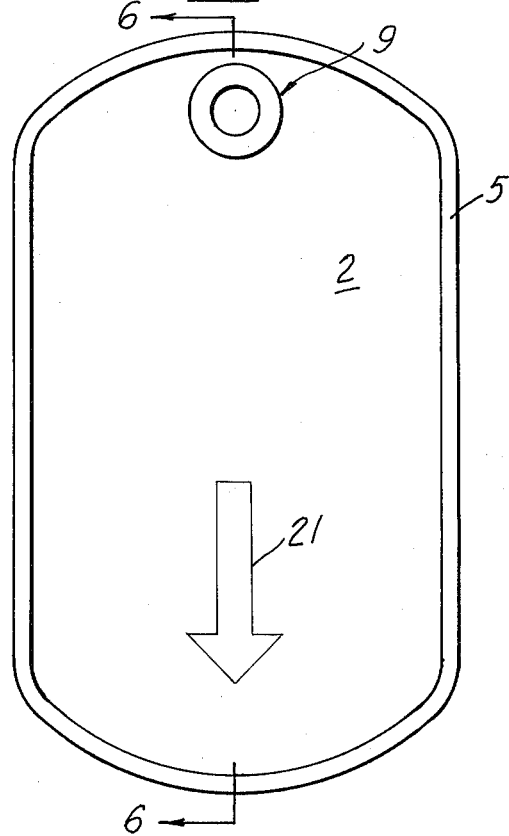
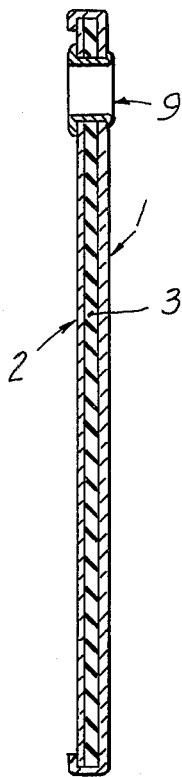

METAL MAGNETIC KEY

This invention relates to a magnetic card key of the type that is adapted to actuate various types of magnetically operated sensors, including reed switches, coils, Hall cells, magnetic pins and locks. The invention will be described herein as applied to a lockset structure which includes one or more magnetic locking pins that normally cooperate with holes in a locking plate to hold a movable slide in locked position. When the magnetic card key is inserted in the lock, magnetic spots on the card key magnetically repel the locking pins out of the holes in the locking plate, thus permitting the slide to be moved by the proper card key to an unlocking position to open the lockset.

Heretofore most magnetic card keys of the subject type have been made of flexible plastic and have usually comprised a pair of plies of plastic material between which is sandwiched a sheet of readily magnetizable material such as a rubberized sheet of material containing barium ferrite.

Numerous disadvantages exist in such plastic card keys and their use in the past has been circumscribed for various reasons:

First, the structural strength of such plastic card keys is considerably below that of other available materials—for example, structurally strong metals such as stainless steel. This structural weakness restricts the use of such plastic keys to conditions under which care can be taken to preserve the structural integrity of the deivce.

Another limitation to the use of such plastic keys is that the plastic employed does not lend itself to use with attachments such as eyelets to provide means for conveniently carrying such card keys as by a key ring or the like.

The main object of the present invention is the provision of a rigid metal card key which overcomes the above noted disadvantages of plastic card keys and greatly increases the potential use of magnetic card keys.

Another object of the invention is the provision of a metal card key which is constructed of extremely strong materials for optimum structural strength and resistance to high temperature, wear, impact and other adverse factors.

Still another object of the invention is the provision of a metal card key that can be formed to minimum thickness without sacrificing the strength required to depress the movable slide and turn the housing in its associate lockset.

Yet another object of the invention is the provision of a substantially indestructible card key which lends itself to being debossed, stamped and engraved for permanent identification.

Another object of the invention is the provision of a magnetic card key having a structurally strong exterior and which at the same time permits the encoding of the key through the metal of the key with magnetic spots which are sufficiently strong and permanent to actuate the associated lockset in an efficient and dependable manner.

Other objects and advantages will be apparent from the following specification and from the drawings:

FIG. 1 is a plan view of the card key housing.

FIG. 2 is a plan view of the magnetizable interior member.

FIG. 3 is a plan view of the cover.

FIG. 4 is a section taken in a plane indicated by lines 4—4 of FIG. 1.

FIG. 5 is a greatly enlarged plan view of the assembled card key.

FIG. 6 is a section taken in a plane indicated by lines 6—6 of FIG. 5.

In detail, and first with reference to FIG. 6 the card key comprises three main elements: a pair of sheets of metallic material generally designated 1, 2 between which is sandwiched a planar member 3 of highly magnetizable material, such as a rubberlike compound containing barium ferrite.

The housing 1 is shown in FIGS. 1, 4 and preferably comprises a sheet of nonmagnetic stainless steel formed with a peripheral flange 5 within which are received the magnetizable member 3 (FIG. 2) and the cover 3 (FIG. 3) which is preferably of magnetizable stainless steel.

At assembly the flange is crimped over the cover 2 to provide the configuration of FIG. 5.

To provide means for conveniently carrying the key the planar member 3 may be provided with an aperture 7 and, at assembly, sheets 1, 2 may be punched with registering holes so as to permit an eyelet generally designated 9 to be fixedly secured by swaging as seen in FIGS. 5, 6.

The housing 1 and cover 2 may be conveniently be formed of stainless steel having a thickness of only about 0.010 inch. The magnetizable layer 3 may be only in the order of 0.020 inch thick to provide magnetic spots of suitable magnetic strength. Thus, the thickness of the main body portion of the key need not exceed 0.040 inch to provide a substantially indestructible assemblage. The width and length of the complete key need not exceed 1.5 inches and 2.5 inches respectively.

After assembly the magnetizable layer 3 may be magnetized with a plurality of magnetic spots by passing a strong magnetic field through the card from a pair of pole pieces (not shown) charged with direct current. In FIG. 2 an example of a method of arranging such spots in a predetermined manner is shown. A predetermined field of magnetic spot positions is indicated by the numerals 15, and a certain combination of magnetic spots may be impressed at a number of selected positions such as the four spots indicated by dotted lines at 17.

Since the number of spot positions may be in the order of 35, as shown in FIG. 2, it will be apparent that the number of combinations of only three or four magnetic spots is an almost limitless amount, thus enhancing security.

One example of the type of lock structure with which the herein described magnetic card key may be used is disclosed in my copending patent application Ser. No. 746,705 filed Dec. 2, 1976. The card 62 in that disclosure may be of the type described herein and it will be noted that by inserting the card into the lockset with the cover 2 facing away from the magnetic locking pins the nonmagnetic housing 1 of the card does not magnetically interfere with the actuation of the locking pins by the magnetic spots 17.

By making the cover 2 of magnetic material such as magnetic stainless steel said cover acts as a keeper to strengthen the effect of the magnetic spots and at the same time shields the card from outside magnetic influences.

It is possible to make an operative card key by making both housing 1 and cover 2 of nonmagnetic materials and thus permit the use of magnetic spot positions to make the card key reversible. However, it is preferable to make cover 2, that is, the side facing away from the magnetic locking pins, of magnetic material to gain the above noted advantages. To this end an indicium such as an arrow indicated at 21 in FIG. 5 may be stamped on cover 2 to indicate to the user the manner in which the key is used.

The particular contour of the key and its elements with rounded corners as indicated minimizes any danger of the device snagging on clothing or other articles. The eyelet 9 permits securement of the card key to a conventional key ring or to a hook for storage purposes.

As states above, although both housing 1 and cover 2 may be of nonmagnetizable material it is preferable that the cover be of magnetizable material for the reasons stated. Another advantage of the preferred structure is that it lends itself to use with a single pole encoding device operated from one surface which need not incorporate a steel backing plate to increase the magnetic strength of the spots; this function being performed by the magnetizable cover itself.

Another advantage inherent in the invention is that the card key need not be discarded when it is desired to change the combination of the lockset— it merely being necessary to demagnetize the key with a degausser and apply new magnetic spots as desired.

I claim:

1. A generally planar metal card key comprising:
   a pair of sheets of metallic material,
   a planar member of magnetizable material interposed between said sheets and coded with magnetic spots,
   means fixedly securing said sheets together along their peripheries and clamping said member between said sheets,
   one of said sheets being of nonmagnetizable material.

2. A card key according to claim 1 wherein one of said sheets is of nonmagnetizable material and one of magnetizable material.

3. A card key according to claim 1 wherein both of said sheets are of nonmagnetizable material.

4. A generally planar metal card key adapted for use with a lock which includes at least one locking pin adapted to be moved from a locking position to an unlocking position by a magnetic spot on such key when the latter is inserted in said lock,
   said key comprising:
   a pair of sheets of metallic material,
   a planar member of magnetizable material interposed between said sheets and coded with at least one magnetic spot in a predetermined location,
   means fixedly securing said sheets together along their peripheries and clamping said member between said sheets,
   one of said sheets being of magnetizable metal and the other of nonmagnetizable metal.

* * * * *